Feb. 6, 1923.
R. C. PENFIELD.
APPARATUS FOR UNLOADING KILNS BY CONVEYER BELTS.
FILED JUNE 1, 1920.
1,444,207.
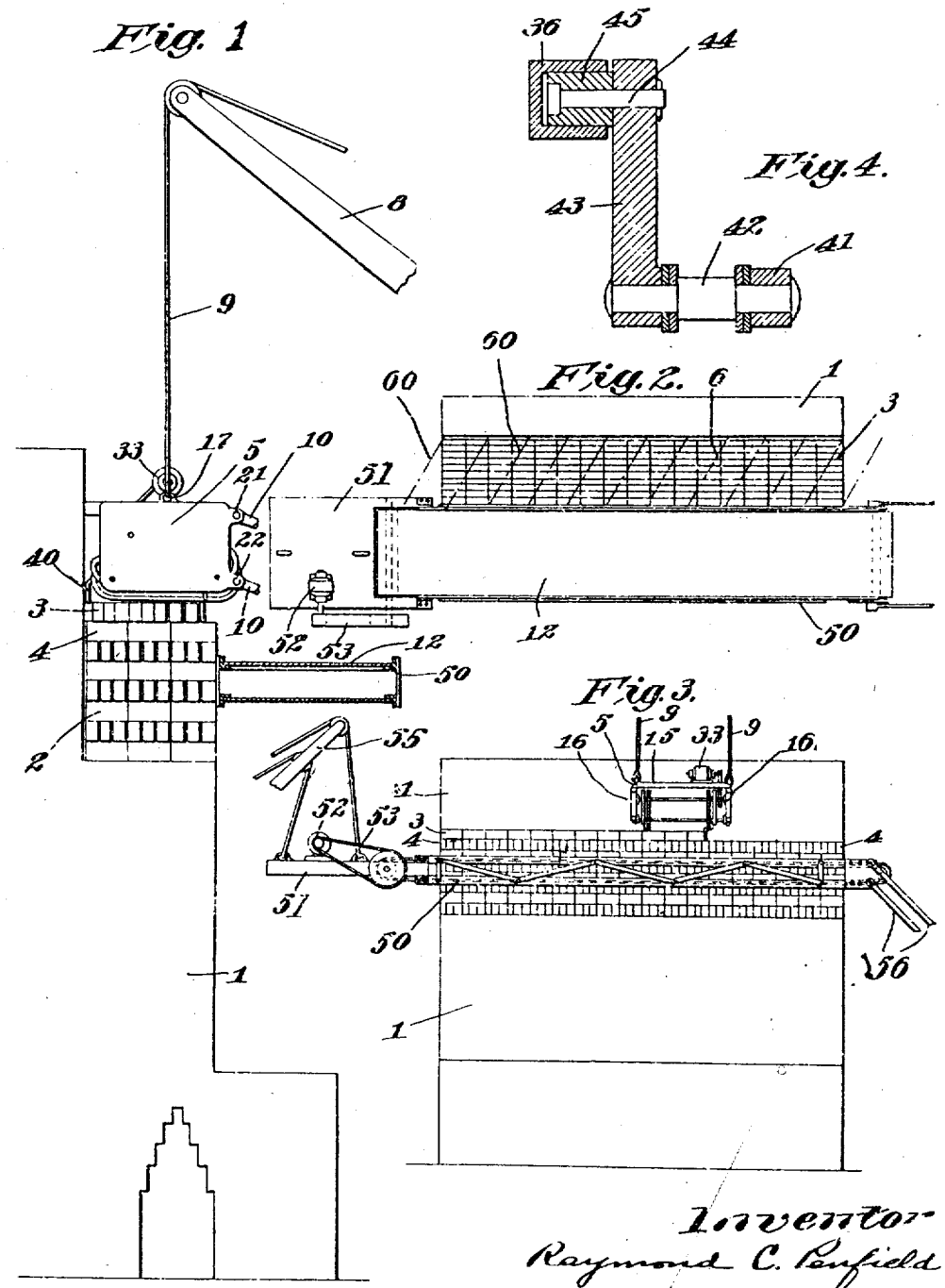
Inventor
Raymond C. Penfield
by James R. Hodder
Attorney

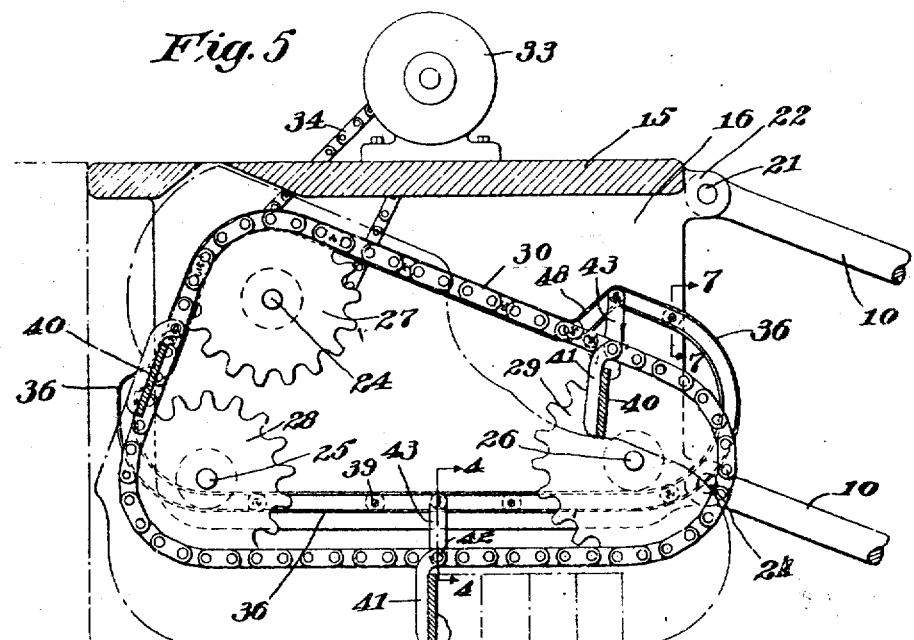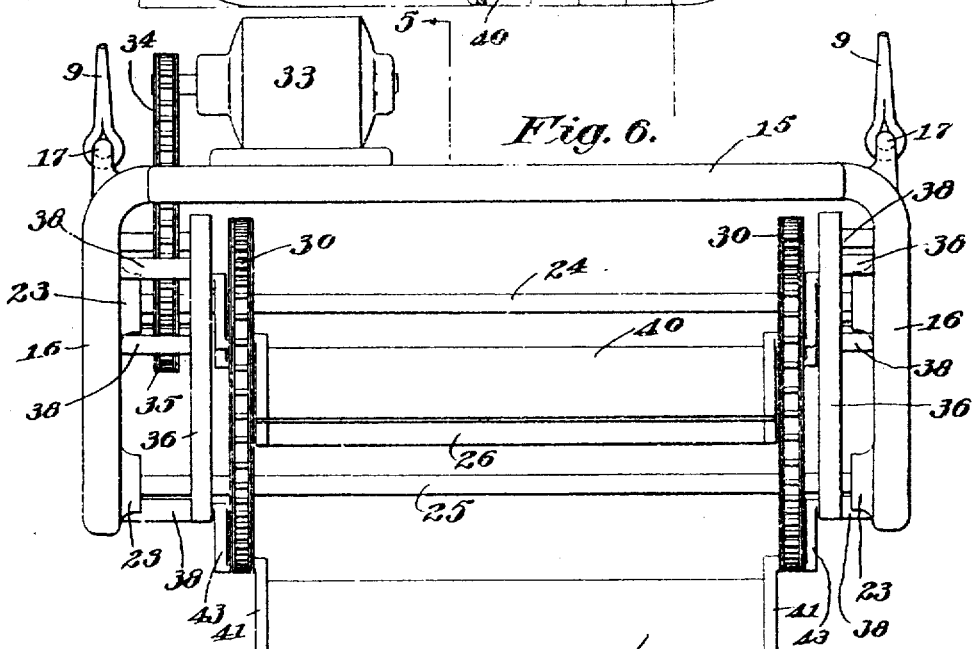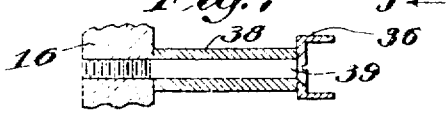

Patented Feb. 6, 1923.

1,444,207

UNITED STATES PATENT OFFICE.

RAYMOND C. PENFIELD, OF NEW YORK, N. Y.

APPARATUS FOR UNLOADING KILNS BY CONVEYER BELTS.

Application filed June 1, 1920. Serial No. 385,636.

*To all whom it may concern:*

Be it known that I, RAYMOND C. PENFIELD, a citizen of the United States, and resident of New York, in the county of New York and State of New York, have invented an Improvement in Apparatus for Unloading Kilns by Conveyer Belts, of which the following description, in connection with the accompanying drawings, is a specification, like letters on the drawings representing like parts.

My present invention is an apparatus for mechanically removing brick or the like from kilns, piles, stacks, etc., and is a continuation in part of my prior application, Ser. No. 383,571, filed May 22, 1920.

As explained in my said prior application, my invention contemplates the use of mechanical means, preferably power actuated, which will separate a predetermined mass of brick from a pile, stack or kiln, forcibly remove the brick thus separated from the stack, and transfer them onto carrying devices, which devices may be lifting apparatus, hoppers or the like, such as illustrated in my copending application Ser. No. 384,285, filed May 26, 1920, and also continuous conveying apparatus as illustrated in the present invention. The object of this invention is to enable brick in large numbers and quantities to be quickly removed by mechanical means, saving hand operation heretofore necessary in unloading the brick kilns, and in removing the brick from such kiln, pile or stack, onto other carriers for loading cars, boats, trucks or transporting the brick to other piles. While mechanical brick handling apparatus have been successfully employed in building a kiln and setting brick therein, no commercial machine has heretofore been devised to take the place of the hand operation of unloading brick, while several efforts along this line have been attempted.

In my present invention I prefer to employ continuously operating devices, both to transport or carry brick when removed from the kiln, as well as to effect the separation and removal of the brick from the kiln onto the carrying devices. In carrying out my invention I employ a mechanical separator and remover, preferably in the form of a continuously rotating endless belt, having one or more brick separating and engaging members thereon, which apparatus is designed to be suspended over the topmost tier of the mass of brick to be removed, and then moved laterally throughout the length of such tier,—viz. the width of the kiln—while the endless belt continuously actuates to successively engage, separate and remove portions of the brick. This separating and removing apparatus could be employed to transfer a row or rows of brick onto a hopper, carrier or the like, such as illustrated in my said copending application, Ser. No. 384,285, but preferably I use a continuous belt apparatus to move a single row of brick onto a continuously moving carrier, which latter is arranged at the face of the stack or kiln and preferably slightly below the course or courses being removed.

Further features of the invention, novel combinations of parts and advantages will be hereinafter more fully pointed out and claimed.

Referring to the drawings, illustrating a preferred embodiment of my invention,

Fig. 1 is a fragmentary view of the face of a brick kiln, with the separating apparatus and traveling belt shown in position for use;

Fig. 2 is a plan view;

Fig. 3 is an end view;

Fig. 4 is an enlarged cross-sectional detail on the line 4—4 of Fig. 5;

Fig. 5 is an enlarged view, partly in cross-section, of the endless belt separating and removing apparatus, taken on the line 5—5 of Fig. 6;

Fig. 6 is an elevational view of the same; and

Fig. 7 is a cross-sectional view on the line 7—7 of Fig. 5;

Referring to the drawings, I have designated the face of a brick kiln at 1, showing a portion of the kiln with brick removed and a unit stack of brick indicated generally at 2 being removed. These brick kilns, if built by mechanical setters, will be usually constructed of units approximately of the setting and dimensions shown in Fig. 2, and such units are therefore readily capable of removal by my mechanical unloading apparatus. The brick is set with alternate rows at right angles to each other, as is usual, and my apparatus is designed equally to separate and remove a course of brick, whether transversely of the line of action of the removing action, as shown at the course designated 3, Fig. 1, or longitudinally as the course 4. The separating and removing apparatus indicated at 5, is suspended from a crane of any suitable type. Preferably I employ a brick handling and revolving crane of the "full circle swing type", illustrated in U. S. patent application Ser. No. 362,650, filed March 2, 1920, wherein a raising and lowering beam, shown at 8, carries the apparatus 5 by flexible cables 9, and also is equipped with parallel links 10, 10, to maintain the apparatus 5 in position, hold it horizontal and resist the thrust of the brick separating and removing instrumentalities. An overhead traveling crane with transverse carriage is equally useful and in either instance the apparatus 5 can be positioned at proper height and moved step by step or continuously across the face of the kiln while simultaneously separating and sweeping or removing the topmost layer of brick therefrom and onto the surface of the conveyer 12.

The apparatus 5, as best shown in Figs. 5 and 6, comprises a top frame 15 and side plates 16. The supporting cables 9 being attached to eye-bolts 17, at convenient places, and parallel arms 10, 10, pivoted at 21, to lugs 22 on the end plates. These arms 10, 10, constitute "crowding" rods and thrust members and tend to hold the apparatus level and steady and are carried by the supporting crane in the manner shown in said copending application, 362,650, or equivalent manner.

Between the side frames 16 in suitable bearings therefor indicated at 23, 23, 23, are a plurality of shafts 24, 25 and 26, on which are mounted gear wheels 27, 28 and 29, said wheels carrying a pair of sprocket chains 30, 30. The topmost shaft 24, is preferably arranged to receive power from a motor 33, mounted on the top frame 15, through a sprocket chain 34 and a pinion 35 secured to said shaft 24. Within the side frames 16 are a pair of cam guides 36, 36, secured to the side frame 16 by studs 38, 38, and tapped bolts 39 extending therethrough (see Fig. 7).

Carried by the sprocket chains 30, are a plurality of brick separating and removing paddles or cross-bars 40, these members being mounted on arms 41, 41, keyed through one of the link studs 42, which acts as a rockshaft and having an upwardly extending lever arm 43 thereon, with a right angled stud 44, carrying a roll 45 engaging the cam path 36 (see Fig. 4). This arrangement provides that the relative position, vertical or horizontal, of the paddles 40, will be determined by the curve and position of the cam path 36. The purpose of this arrangement is to insure the vertical positioning of the paddles 40 as the same come downwardly during their continuous rotation, and at the point where they will engage and separate a row of brick from the mass of the kiln. Also the cam path is so formed that it will maintain these paddles 40 in a substantially vertical position during the traversing of the distance from the lowermost wheels 28 to 29 during the brick removing operation. As shown in Fig. 1, the paddle 40 at the position where it is just entering behind the row of brick to be removed—which latter may have been spaced slightly by an operator with a spade—or a paddle 40 itself may effect this spacing and wedging action, as it is moved vertically through this part of its travel—and thereupon follows the horizontal path of the sprocket chains forcing off the row or course of brick 3. Thereupon the cam path 36—see Fig. 5—still maintains the paddle 40 in a substantially vertical position while lifting it out of the line of travel of said brick. During the remainder of the travel, the paddle may be and preferably is swung horizontally through the sharp curve 48, swinging the paddle upwardly and forwardly of the line of travel so as to be in position for the vertical downward movement at the brick engaging point as above explained.

The conveyer belt 12 is of usual construction consisting in an endless belt rotating around suitable rollers at the end of a framework indicated generally at 50, and held at proper height to receive the course or courses of brick being removed and in contact with the face of the kiln, approximately as shown in Figs. 1, 2 and 3. This conveyer frame may be supported in any desired manner, it being here shown as having one end 51 on which a motor 52 furnishes power through a belt 53 to rotate the conveyer, which support 51 is held in desired vertical position by a crane of any suitable type, the beam 55, showing a portion of same in conventional form, and the other end of the frame 50 being supported by parallel links or arms 56, so that the entire frame may be kept level and raised or lowered during the progressive action of unloading successive courses of brick thereon. I find it feasible to position the frame 50 and belt 12 below a plurality of courses of brick, and thereupon maintain the belt in this height while said plurality of courses of brick are removed by the separating and engaging apparatus. Thereupon the frame 50 can be lowered three or four courses and the removing continued before again lowering the same.

The operation of my apparatus will be readily comprehended. The conveyer belt 50 being positioned adjacent the topmost course or courses to be removed and the apparatus 5 swung thereover, the motors are started, and the brick in the topmost row 3 successively engaged by paddles 40 and forced or slid thereover onto the surface of the belt 12, which conveyer belt, being in motion, transfers the same to a car, truck, platform or other desired position. I prefer to so arrange the plurality of paddles 40, proportioned with the speed of rotation of the sprocket chains 30, that the entire apparatus 5 can be moved continuously and transversely of the course of brick 3 being removed, thus giving a line of travel to the paddles 40, indicated by the slanting lines 60 in Fig. 2, successive paddles 40 engaging successive masses of brick and preferably overlapping so that although the paddles 40 are of a length equal to the width of the apparatus 5, yet the speed of rotation will bring these paddles 40 into operative position slightly overlapping the space of the preceding paddle and thus surely engaging all the brick in the row. Thereupon the apparatus 5 can be lowered for the next row, while continuously operating and moved backwardly across the face of the kiln, sliding, forcing and mechanically removing with as great a speed as may be desired, the entire brick in the course. The plurality of courses of brick having been removed, the frame 50 and conveyer are then lowered, and the operation repeated. Thus the entire bricks in the kiln are removed mechanically with great speed and without manual handling. While I preferably design the apparatus 5 to cover and remove a dimension of bricks based on the usual unit of setting the same, this of course, is entirely optional, and a larger or lesser number can be as readily operated upon by the separating and removing devices 5. By my apparatus freight cars can be run in alongside the brickyard as is usual, and the brick mechanically removed from the kiln, the conveyer 12 transferring said brick, either directly or through other conveyers, into the car and thus removing the brick from the kiln, conveying to the transporting device and loading them onto or into the transporting device, car, boat or the like, entirely without manual handling, and in an expeditious manner capable of great speed without injury to the brick and with only one or two operators.

While I have described my apparatus as designed and primarily intended for handling brick in stacked piles, units or kilns, it will be understood that the same may be utilized in unloading or removing similar articles, such as lumber, cut stone, as well as sand or many other operations where such a conveyer can be utilized to advantage.

My invention is further described and defined in the form of claims as follows:

1. Mechanical brick handling apparatus of the kind described, comprising continuously moving brick engaging devices adapted to separate a plurality of brick in a stack, and to move the same from stacked position, comprising means to maintain the brick engaging devices in a substantially vertical line while entering the plane of the brick to be removed.

2. Mechanical brick handling apparatus of the kind described, comprising continuously moving brick engaging devices adapted to separate a plurality of brick in a stack, and to move the same from stacked position, comprising means to maintain the brick engaging devices in a substantially vertical line while entering the plane of the brick to be removed, and during the brick removing operation.

3. Mechanical brick handling apparatus, comprising a continuously moving conveyer adapted for adjustment in a vertical plane, means to hold the same in vertical adjusted position, adjacent the brick to be moved, in combination with means to engage brick in courses and forcibly transfer the same onto the continuously moving conveyer while the latter is held in its adjusted position adjacent thereto.

In testimony whereof, I have signed my name to this specification.

RAYMOND C. PENFIELD.